3,086,961
WATER-SOLUBLE DIBASIC ACID-POLYALKYL-ENEPOLYAMINE-ALKYLENE GLYCOL CROSS-LINKED POLYMER
Ronald R. House, Darien, John H. Rassweiler, Greenwich, and Joseph M. Schmitt, Ridgefield, Conn., assignors to American Cyanamid Company, New York, N.Y., a corporation of Maine
No Drawing. Filed Dec. 7, 1959, Ser. No. 857,493
9 Claims. (Cl. 260—75)

This invention relates to novel water-soluble resinous compositions. More particularly this invention relates to novel resinous compositions and the production thereof from components consisting essentially of (a) a dibasic (dicarboxylic) acid or the anhydride or ester thereof, (b) a polyalkylene polyamine, (c) an alkylene glycol and (d) a cross-linking agent, wherein the reactants present and the process employed during the formation thereof are carefully regulated.

The resinous compositions produced according to the invention are water-soluble and find employment in the treatment, in either alkaline or acid conditions, of textiles, cellophane and the like. These compositions may also be employed in wood laminating operations; for sizing glass fibers and as wood adhesives. Another particular use in which the novel resinous composition may be employed is in the preparation of cellulosic webs including paper of improved wet strength composed of cellulosic fibers bonded together by a content of said novel resin.

It is an object of our invention to produce a novel resinous composition. It is a further object of our invention to produce a novel, economical water-soluble resinous composition which may be employed advantageously in either acid or alkaline media and which contains an alkylene glycol as an essential component. These and other objects of our invention will be discussed more fully hereinbelow.

The preparation of the novel resinous compositions of the present invention is carried out in a process comprising two principal steps or stages. A dibasic acid (a), an alkylene polyamine (b), and an alkylene glycol (c) of the types hereafter more specifically identified, are initially reacted in mole ratios respectively of from about 1:0.9:0.1 to about 1:0.65:0.35 until from about 1.5 to about 2.5 moles of water per mole of the dibasic acid are produced by the reaction and removed from the reaction product such as by distillation. This first stage has been completed when the reaction product has a viscosity which may range from the low point of about E to a high point of just short of the gel stage, or about $Z^6$, on the Gardner-Holdt scale at 50% solids and 25° C. This backbone product is then diluted to about 20–80% solids, preferably 30–50% solids, and reacted in a second stage with from about 0.3 to about 1.5 moles of a cross-linking agent, preferably 0.5 to 1.2 moles, per mole of dibasic acid in the condensation product until a 30% resin solution in water reaches a Gardner-Holdt viscosity at 25° C. of from about A to just short of the gel point, i.e., up to about $Z^6$ on the Gardner-Holdt scale. The preferred Gardner-Holdt viscosity at 25° C. and 30% solids is between E and J. The reaction is stopped by dilution of the product to about 10% solids and adjusting the pH to about 4–5. It will be apparent that the stability of the reaction product will be affected to a significant extent by then viscosity of the reaction product, i.e., the product with lower viscosity and lower solids content may be retained in a stable condition (without gelation) for longer periods. For example, a cross-linked reaction product having a Gardner-Holdt viscosity of about G at 25° C. and 30% resin solids is preferably diluted to about 10% resin solids. With products having a lower viscosity, solutions having 20% solids content and even higher may have suitable stability. As an aid to stability of the product, particularly where storage for an appreciable period is contemplated, a small amount of a monofunctional material, i.e., from about 0.5% to about 2% based on the percent polymer solids and known to react with the residual polyamine, may be added to the cross-linked product. Suitable materials for this purpose are known to those skilled in the art and include, for example, the alkylene oxides such as ethylene oxide and propylene oxide; alkyl chlorides and bromide, e.g., ethylene chloride, butyl bromide, etc.; allyl chloride, allyl bromide, and the like.

The dibasic or dicarboxylic acids contemplated as suitable in the invention are those of the formula

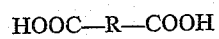
HOOC—R—COOH wherein R is a divalent radical selected from the group consisting of alkylidene radicals containing 2 to 16 carbon atoms; alicyclic and aromatic radicals; and the esters and anhydrides of these acids. Dibasic acids of this type, their esters or anhydrides, are for example, adipic acid, dimethyl adipate, succinic acid, succinic anhydride, diglycolic acid, sebacic acid, isosebacic acid, azelaic acid, glutaric acid, suberic acid, the aromatic dibasic aids, e.g., phthalic acid, phthalic anhydride, isophthalic, terephthalic, dibenzoic acid and the dicarboxylic acids and esters such as those disclosed in U.S. Patent 2,780,609.

Suitable polyalkylene polyamines which may be utilized in the reaction with dibasic acid and the alkylene glycol are those represented by the general formula

$H_2N(C_mH_{2m}NY)_pC_mH_{2m}NH_2$

Wherein Y is selected from the group consisting of H and $C_mH_{2m}NH_2$, m is an integer of from 2 to 4 and p is an integer of from 1 to 4. Polyalkylene polyamines falling within the scope of the general formula set forth above are such as diethylene triamine; triethylene tetramine; tetraethylene pentamine; bishexamethylene diamine; 3,3′-iminobispropylamine; 3,3′,3″-nitrilotris-propylamine; and the like. The alkylene groups may be substituted by non-ionic groups but the polyalkylene polyamine, as a whole, must be water-soluble. Preferred amines are those which are essentially composed of the lower alkylene linkages such as

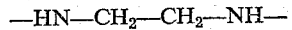
—HN—CH$_2$—CH$_2$—NH— or

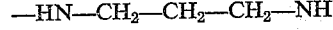
—HN—CH$_2$—CH$_2$—CH$_2$—NH since these amines are readily available, freely water-soluble and yield ultimate resins having desired properties.

Suitable alkylene glycols which may be employed are well known to those skilled in the art. In general those having the general formula

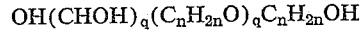
$OH(CHOH)_q(C_nH_{2n}O)_qC_nH_{2n}OH$ wherein q is an integer of from 0 to 6 and n is an integer of from 2 to 4, are contemplated. Illustrative glycols of this type are such as ethylene glycol, diethylene glycol, triethylene glycol, tetraethylene glycol, propylene glycol, dipropylene glycol, tripropylene glycol, the higher glycols referred to generically as polyalkylene glycols, glycerine and the like.

The first stage reaction between the dibasic acid, the polyalkylene polyamine and the alkylene glycol is carried out at a temperature ranging from about 135° C. to about 250° C., preferably from about 140° C to about 180° C. Reaction is continued within this temperature range until the condensation reaction emits from about 1.5 to about 2.5 moles of water and preferably about 1.7 to about 2.2 moles of water per mole of dibasic acid employed and the viscosity is within the aforementioned range.

After the initial reaction has been carried out to obtain a product from which water has been removed in the amounts set forth above and said product dissolved in water to give a 20–80% solution, a sufficient amount of cross-linking agent is added to this "backbone" product and reacted under controlled conditions to produce a high molecular weight water-soluble composition. It is significant to note that viscosity is not of itself important, in the absence of a cross-linked structure, to impart the desirable properties to the resinous composition.

The cross-linking agent, preferably epichlorohydrin or diglycidyl ether, is employed in amounts which may vary from about 0.3 to about 1.5 moles per mole of dibasic acid. Preferably the cross-linking agent is used in quantities varying from about 0.5 to about 1.2 moles per mole of dibasic acid which is chemically combined in the backbone condensation product. The cross linking reaction may be conducted at temperatures ranging from room temperature to reflux but preferably from about 50° C. to about 80° C. and until the resulting product has a Gardner-Holdt viscosity, at 25° C., of about G at which point further cross-linking is inhibited by diluting with water, adjusting the pH to 4–6 (preferably about pH 5) and cooling. Compounds which may be employed to effect cross-linking according to the invention are any of the various cross-linking agents which are available or which are known to those skilled in the art as suitable for this purpose. In addition to epichlorohydrin and diglycidyl ether, additional compounds which may be used include any of the organic difunctional compounds, such as glyoxal, methylene bisacrylamide, crotonaldehyde, divinyl sulfone, divinyl ether, ethylene dichloride, diallylamine, glycidyl aldehyde, and the like, all of which are known to react with amines.

The resinous composition thus formed is a water-soluble material. The resinous syrup may be diluted with water to any desired solids content for employment in any of a variety of processes for improving the properties of paper, textile, cellophane, etc.

In order that those skilled in the art may more fully understand the inventive concept herein presented, the following examples are given by way of illustration. It will be understood that although these examples may describe in detail some of the more specific features of the invention they are given primarily for purposes of illustration and the invention in its broader aspects is not limited thereto. All parts are parts by weight.

GENERAL PROCEDURE

The dicarboxylic acid is added to a reaction vessel equipped with gas inlet tube and mechanical stirrer, and connected to a distillation apparatus. Nitrogen is introduced through the gas inlet tube and then the alkylene polyamine and glycol are added. After completing the addition of amine and glycol, the reaction mixture is kept at 155°–175° until the desired amount of water is distilled over and the desired viscosity is obtained.

The product of the reaction is a solid at room temperature, has a high softening point (100–120°) and is soluble in water. A 20–80% water solution of the condensation product is cross-linked by addition of the specified quantities of cross-linking agent and reacting at about 60° C. until a 30% solution has a Gardner viscosity of about G.

Composition proportions and results obtained from a series of runs using the resin on paper, including runs made for comparative purposes, are set forth in Tables I to VI.

Table I
EFFECT OF RESINS WITH AND WITHOUT ETHYLENE GLYCOL

| Ex. | Resin description [1] "Backbone" | | Reacted with mole percent epichlorohydrin | Wet tensile strength (lb./in.)[2] of paper made at— | | |
|---|---|---|---|---|---|---|
| | Composition | Molar ratio | | pH 4.5 | pH 6.0 | pH 8.0 |
| 1 | AA/DETA | 1/1 | 10 | ------ | 3.7 | 5.7 |
| 2 | AA/DETA/EG | 1/0.75/0.25 | 10 | ------ | 4.8 | 5.9 |
| 3 | AA/DETA | 1/1 | 20 | ------ | 4.0 | 6.4 |
| 4 | AA/DETA/EG | 1/0.75/0.25 | 20 | ------ | 5.8 | 6.4 |
| 5 | AA/DETA | 1/1 | 30 | 4.3 | 5.5 | 7.0 |
| 6 | AA/DETA/EG | 1/0.75/0.25 | 30 | 5.1 | 6.2 | 7.0 |
| 7 | AA/TEPA | 1/1 | 25 | ------ | 2.9 | 5.2 |
| 8 | AA/TEPA/EG | 1/0.75/0.25 | 25 | ------ | 5.2 | 5.3 |
| 9 | AA/TEPA | 1/1 | 50 | 4.1 | 5.4 | 6.7 |
| 10 | AA/TEPA/EG | 1/0.75/0.25 | 50 | ------ | 6.5 | 7.0 |

[1] AA=adipic acid, DETA=diethylene triamine, TEPA=tetraethylene pentamine, EG=ethylene glycol.
[2] 1% resin (solids based on dry fiber) added to 0.6% bleached northern kraft pulp at indicated pH. Handsheets formed at same pH. Wet tensile figures corrected to 50 lb. basis weight (25" x 40"—500) handsheet.

Table II
EFFECT OF AMOUNT OF ETHYLENE GLYCOL

| Example | Resin description [1] "Backbone" | | Wet tensile strength (lb./in.)[2] of paper made at— | |
|---|---|---|---|---|
| | Composition | Molar ratio | pH 6.0 | pH 8.0 |
| 11 | AA/TEPA | 1/1 | 5.4 | 6.7 |
| 12 | AA/TEPA/EG | 1/0.75/0.25 | 6.6 | 7.0 |
| 13 | AA/TEPA/EG | 1/0.5/0.5 | 4.7 | 4.8 |
| 14 | AA/TEPA/EG | 1/0.5/0.5 | 4.4 | 4.6 |
| 15 | AA/DETA | 1/1 | 4.3 | 5.9 |
| 16 | AA/DETA/EG | 1/0.8/0.2 | 4.8 | 5.9 |
| 17 | AA/DETA/EG | 1/0.75/0.25 | 5.0 | 5.8 |

[1] The resin in each run is reacted with 50 mole percent epichlorohydrin based on the adipic acid.
[2] 1% resin (solids based on dry fiber) added to 0.6% bleached northern kraft pulp at indicated pH. Handsheets formed at same pH. Wet tensile figures corrected to 50 lb. basis weight (25" x 40"—500) handsheet.

Table III
EFFECT OF AMOUNT OF DIETHYLENE GLYCOL (DEG)

| Example | Resin description, molar ratio of adipic acid/DETA/DEG plus 30% epichlorohydrin | Wet tensile strength (lb./in.)[1] of paper made at | |
|---|---|---|---|
| | | pH 6.0 | pH 8.0 |
| 18 | 1/1/0 | 4.8 | 6.4 |
| 19 | 1/0.75/0.25 | 5.8 | 6.5 |
| 20 | 1/0.65/0.35 | 5.5 | 6.6 |
| 21 | 1/0.5/0.5 | 3.2 | 3.5 |

[1] 1% resin (solids based on dry fiber) added to 0.6% bleached northern kraft pulp at indicated pH. Handsheets formed at same pH. Wet tensile figures corrected to a basis weight (25" x 40"—500) of 50 lb.

Table IV
EFFECT OF AMOUNT OF CROSS-LINKING AGENT ILLUSTRATED BY USE OF EPICHLOROHYDRIN

| Example | Mole percent epichlorohydrin[1] | Wet tensile strenght (lb./in.) of paper made at— | |
|---|---|---|---|
| | | pH 6.0 | pH 8.0 |
| 22 | 1.0 | 1.5 | 1.5 |
| 23 | 1.5 | 1.5 | 1.6 |
| 24 | 5 | 2.0 | 3.8 |
| 25 | 10 | 4.8 | 5.9 |
| 26 | 20 | 5.8 | 6.4 |
| 27 | 30 | 6.2 | 7.0 |
| 28 | 50 | 6.5 | 7.4 |
| 29 | 100 | 5.3 | 6.1 |
| 30 | 200 | 4.2 | 4.3 |

[1] Percent epichlorohydrin based on backbone (AA/DETA/EG—1/0.75/0.25) solids. 1% resin (solids based on dry fiber) added to 0.6% bleached northern kraft pulp at indicated pH. Handsheets formed at same pH.

Examples 31 through 34 in Table V below show results with the use of diglycidyl ether and epichlorohydrin as cross-linking agent in runs with and without ethylene glycol.

Table V

| Ex. | Resin composition | | Cross-linking agent (Mole percent) | Wet tensile strength (lbs./in.) of paper made at— | |
|---|---|---|---|---|---|
| | "Backbone" | Molar ratio | | pH 6.0 | pH 8.5 |
| 31 | Adipic acid/TEPA [1]/EG.[2] | 1/0.75/0.25 | 20% DGE [3] | 6.6 | 7.0 |
| 32 | ___do___ | 1/0.75/0.25 | 50% epi.[4] | 6.5 | 7.0 |
| 33 | Adipic acid/TEPA | 1:1 | 20% DGE | 5.2 | 6.9 |
| 34 | ___do___ | 1:1 | 50% epi | 5.3 | 6.1 |

[1] Tetraethylene pentamine.
[2] Ethylene glycol.
[3] Diglycidyl ether.
[4] Epichlorohydrin.

NOTE.—2% resin (solids based on dry fiber) added to bleached northern kraft pulp at indicated pH.

Examples 35 through 38, the composition ratio and wet tensile strength* for which are set forth in Table VI, illustrate the use of other dicarboxylic acids using 50 mole percent epichlorohydrin as cross-linking agent.

Table VI

| Ex. | "Backbone" | Ratio | Wet tensile strenght | |
|---|---|---|---|---|
| | | | pH 6.0 | pH 8.0 |
| 35 | Adipic acid/TEPA/EG [1] | 1/0.75/25 | 6.4 | 6.9 |
| 36 | Succinic acid/TEPA/EG | 1/0.75/25 | 5.9 | 6.3 |
| 37 | Azelaic acid/TEPA/EG | 1/0.75/25 | 5.8 | 6.4 |
| 38 | Suberic acid/TEPA/EG | 1/0.75/25 | 6.1 | 6.5 |

[1] TEPA = tetraethylene pentamine; EG = ethylene glycol.

We claim:

1. The method of preparing a water-soluble resinous composition which comprises reacting (a) a dibasic acid of the formula $$HOOC—R—COOH$$

wherein R is a divalent radical selected from the group consisting of alkylidene radicals containing 2 to 16 carbon atoms, alicyclic radicals, aromatic radicals, and the esters and anhydrides of these acids (b) a polyamine of the formula $$H_2N(C_mH_{2m}NY)_pC_mH_{2m}NH_2$$

wherein Y is selected from the group consisting of H and $C_mH_{2m}NH_2$, m is an integer of from 2 to 4, and p is an integer of from 1 to 4, and (c) a compound of the formula $$OH(CHOH)_q(C_nH_{2n}O)_qC_nH_{2n}OH$$

wherein q is an integer of from 0 to 6 and n is an integer of from 2 to 4, in a mole ratio of (a) to (b) to (c) of from about 1:0.9:0.1 to about 1:0.65:0.35, respectively, until the water yielded by the reaction thereof is from about 1.5 to about 2.5 moles per mole of said dibasic acid, and thereafter cross-linking the reaction product of (a), (b) and (c) with from about 0.3 to about 1.5 moles of an organic difunctional cross-linking agent selected from the group consisting of epichlorohydrin and diglycidyl ether per mole of said dibasic acid until a 30% aqueous solution of the reaction product has a viscosity on the Gardner-Holdt scale of from about A to $Z^6$ at 25° C. and adjusting the pH of the reaction product to about 4–6.

2. The method of preparing a water-soluble resinous composition which comprises reacting (a) adipic acid, (b) a polyamine of the formula $$H_2N(C_mH_{2m}NY)_pC_mH_{2m}NH_2$$

wherein Y is selected from the group consisting of H and $C_mH_{2m}NH_2$, m is an integer of from 2 to 4, and p is an integer of from 1 to 4, and (c) a compound of the formula $$OH(CHOH)_q(C_nH_{2n}O)_qC_nH_{2n}OH$$

wherein q is an integer of from 0 to 6 and n is an integer of from 2 to 4, in a mole ratio of (a) to (b) to (c) of from about 1:0.9:0.1 to about 1:0.65:0.35, respectively, until the water yielded by the reaction thereof is from about 1.5 to about 2.5 moles per mole of adipic acid, and thereafter cross-linking the reaction product of (a), (b) and (c) with from about 0.3 to about 1.5 moles of an organic difunctional cross-linking agent selected from the group consisting of epichlorohydrin and diglycidyl ether per mole of adipic acid until a 30% aqueous solution of the reaction product has a viscosity on the Gardner-Holdt scale of from about A to $Z^6$ at 25° C. and adjusting the pH of the reaction product to about 4–6.

3. The method of preparing a water-soluble resinous composition which comprises reacting (a) adipic acid, (b) diethylene triamine and (c) a compound of the formula $$OH(CHOH)_q(C_nH_{2n}O)_qC_nH_{2n}OH$$

wherein q is an integer of from 0 to 6 and n is an integer of from 2 to 4, in a mole ratio of (a) to (b) to (c) of from about 1:0.9:0.1 to about 1:0.65:0.35, respectively, until the water yielded by the reaction thereof is from about 1.5 to about 2.5 moles per mole of adipic acid, and thereafter cross-linking the reaction product of (a), (b) and (c) with from about 0.5 to about 1.2 moles of an organic difunctional cross-linking agent selected from the group consisting of epichlorohydrin and diglycidyl ether per mole of adipic acid until a 30% aqueous solution of the reaction product has a viscosity on the Gardner-Holdt scale of from about A to $Z^6$ to 25° C. and adjusting the pH of the reaction product to about 4–6.

4. The method of preparing a water-soluble resinous composition which comprises reacting (a) adipic acid, (b) 3,3'-iminobispropylamine and (c) ethylene glycol in a mole ratio of (a) to (b) to (c) of from about 1:0.9:0.1 to about 1:0.65:0.35, respectively, until the water yielded by the reaction thereof is from about 1.5 to about 2.5 moles per mole of adipic acid, and thereafter cross-linking the reaction product of (a), (b) and (c) with from about 0.5 to about 1.2 moles of a cross-linking agent selected from the group consisting of epichlorohydrin and diglycidyl ether, per mole of adipic acid, until a 30% aqueous solution of the reaction product has a viscosity on the Gardner-Holdt scale of from about E to about J at 25° C. and adjusting the pH of the reaction product to a pH of about 5.

5. The method of preparing a water-soluble resinous composition which comprises reacting (a) adipic acid, (b) diethylene triamine, and (c) diethylene glycol in a mole ratio of (a) to (b) to (c) of from about 1:0.9:0.1 to about 1:0.65:0.35, respectively, until the water yielded by the reaction thereof is from about 1.5 to about 2.5 moles per mole of adipic acid, and thereafter cross-linking the reaction product of (a), (b) and (c) with from about 0.5 to about 1.2 moles of a cross-linking agent selected from the group consisting of epichlorohydrin and diglycidyl ether per mole of adipic acid, until a 30% aqueous solution of the reaction product has a viscosity on the Gardner-Holdt scale of from about E to J at 25° C. and adjusting the pH of the reaction product to a pH of about 5.

6. The method of preparing a water-soluble resinous composition which comprises reacting (a) adipic acid, (b) triethylene tetramine, and (c) triethylene glycol in

*1% resin (solids based on dry paper fiber) added to 0.6% bleached northern kraft pulp at pH indicated.

a mole ratio of (a) to (b) to (c) of from about 1:0.9:0.1 to about 1:0.65:0.35, respectively, until the water yielded by the reaction thereof is from about 1.5 to about 2.5 moles per mole of adipic acid, and thereafter cross-linking the reaction product of (a), (b) and (c) with from about 0.5 to about 1.2 moles of diglycidyl ether per mole of adipic acid until a 30% aqueous solution of the reaction product has a viscosity on the Gardner-Holdt scale of about G and adjusting the pH of the reaction product to a pH of about 5.

7. The method of preparing a water-soluble resinous composition which comprises reacting (a) adipic acid, (b) tetraethylene pentamine, and (c) ethylene glycol in a mole ratio of (a) to (b) to (c) of from about 1:0.9:0.1 to about 1:0.65:0.35, respectively, until the water yielded by the reaction thereof is from about 1.5 to about 2.5 moles per mole of adipic acid, and thereafter cross-linking the reaction product of (a), (b), and (c) with from about 0.5 to about 1.2 moles of epichlorohydrin per mole of adipic acid until a 30% aqueous solution of the reaction product has a viscosity on the Gardner-Holdt scale of about G and adjusting the pH of the reaction product to about 5.

8. The proces of claim 1 wherein the reaction product is stabilized by the addition of from about 0.5 to about 2.0% based on the resin solids of an alkylene oxide.

9. The product produced by the method of claim 1.

References Cited in the file of this patent
UNITED STATES PATENTS

| | | |
|---|---|---|
| 2,387,530 | Prichard | Oct. 23, 1945 |
| 2,720,500 | Cody | Oct. 11, 1955 |